UNITED STATES PATENT OFFICE.

HARRY W. GASKILL, OF CLEVELAND, OHIO, ASSIGNOR OF ONE-HALF TO CHARLES F. JOHNSON, OF CLEVELAND, OHIO.

COMPOSITION OF MATTER.

1,180,996.     Specification of Letters Patent.     Patented Apr. 25, 1916.

No Drawing.     Application filed May 8, 1915. Serial No. 26,804.

*To all whom it may concern:*

Be it known that I, HARRY W. GASKILL, a citizen of the United States, residing at Cleveland, in the county of Cuyahoga and State of Ohio, have invented certain new and useful Improvements in Compositions of Matter; and I do hereby declare the following to be a full, clear, and exact description of the invention, such as will enable others skilled in the art to which it appertains to make and use the same.

This invention relates to a new and a useful composition of matter, more particularly a white metal alloy which I call manganese silver, the object of the invention being to produce a novel and metallic compound or alloy which may be used advantageously as a substitute for nickel and which is extremely hard, preserves its color, resists oxidation and the tarnishing and corrosive effects of many gases and liquids and which is capable of being readily machined, is also adapted to be rolled in sheets, is ductile, malleable, and which also may for certain specific purposes be advantageously used as a substitute for steel.

The said invention consists of the composition of ingredients hereinafter fully described and particularly pointed out in the claim.

My improved composition consists of copper, nickel, zinc, manganese copper and in some instances also aluminum and phosphor tin.

For making a composition which will machine I take of copper 56 parts, nickel 15 parts, zinc 25 parts, aluminum $\frac{1}{10}$ per cent., lead 1½ per cent., manganese, (pure, carbon free and free from iron), 4 ounces and magnesium 1 ounce.

To produce a composition from which castings can be made I use of copper 50 parts, nickel 10 parts, zinc 35 parts, lead 2 parts, aluminum alloy 2 parts and manganese 1 part.

To produce a composition especially adapted for use in the manufacture of surgical and dental instruments and the like I use copper 33 parts, nickel 33 parts, zinc 32 parts, manganese 2 parts.

To produce a composition which is ductile and which may be readily rolled in sheets and used for making cooking utensils, tableware, automobile rims, cans for ice cream freezers, shipping cans and the like, which will not corrode, rust or oxidize and which is free from poison in its composition I also provide of copper 60 parts, nickel 12 parts, zinc 18 parts, manganese 5 parts, aluminum 2 parts, magnesium 1 part and phosphor tin 2 parts.

In the preparation of my composition I prefer to first melt the copper in a suitable crucible and as soon as the copper assumes the molten condition I add the quota of nickel, zinc, and the other ingredients and allow the same to become fused and cause the ingredients to be thoroughly mixed by occasional stirring. The composition is then complete and can be cast into whatever form may be desired.

Having thus described my invention, I claim:—

The herein described composition of matter containing copper, nickel, zinc, manganese, aluminum, magnesium and phosphor tin.

In testimony whereof I affix my signature in presence of two witnesses.

HARRY W. GASKILL.

Witnesses:
    CHAS. W. ASQUITH,
    CHARLES F. JOHNSON.